(12) United States Patent
Deng et al.

(10) Patent No.: US 11,609,091 B2
(45) Date of Patent: Mar. 21, 2023

(54) MICROELECTROMECHANICAL SYSTEMS DEVICE INCLUDING A PROOF MASS AND MOVABLE PLATE

(71) Applicant: Knowles Electronics, LLC, Itasca, IL (US)

(72) Inventors: Ken Deng, Schaumburg, IL (US); Michael Pedersen, Long Grove, IL (US); Jeremy Johnson, Glen Ellyn, IL (US); Kevin Meneou, Downers Grove, IL (US)

(73) Assignee: Knowles Electronics, LLC, Itasca, IL (US)

( * ) Notice: Subject to any disclaimer, the term of this patent is extended or adjusted under 35 U.S.C. 154(b) by 87 days.

(21) Appl. No.: 17/138,895

(22) Filed: Dec. 31, 2020

(65) Prior Publication Data

US 2022/0155073 A1    May 19, 2022

Related U.S. Application Data

(60) Provisional application No. 63/114,430, filed on Nov. 16, 2020.

(51) Int. Cl.
*G01C 19/5712* (2012.01)
(52) U.S. Cl.
CPC ................ *G01C 19/5712* (2013.01)
(58) Field of Classification Search
CPC .................................................. G01C 19/5712
See application file for complete search history.

(56) References Cited

U.S. PATENT DOCUMENTS

| 4,882,933 | A  | * | 11/1989 | Petersen | G01P 15/0802 |
|---|---|---|---|---|---|
|  |  |  |  |  | 73/514.33 |
| 8,387,458 | B2 | * | 3/2013 | Aida | G01P 15/0802 |
|  |  |  |  |  | 73/514.33 |
| 9,638,712 | B2 | * | 5/2017 | Tang | B81B 3/0051 |
| 2002/0040602 | A1 | * | 4/2002 | Okada | G01P 15/123 |
|  |  |  |  |  | 73/504.04 |
| 2003/0094046 | A1 | * | 5/2003 | Okada | G01P 15/0907 |
|  |  |  |  |  | 73/504.02 |
| 2003/0205087 | A1 | * | 11/2003 | Challoner | G01C 19/5712 |
|  |  |  |  |  | 73/504.02 |
| 2005/0210981 | A1 | * | 9/2005 | Okada | G01P 15/0922 |
|  |  |  |  |  | 73/514.32 |
| 2006/0179941 | A1 | * | 8/2006 | Okada | G01P 15/0922 |
|  |  |  |  |  | 73/514.32 |
| 2006/0196270 | A1 | * | 9/2006 | Ino | G01P 15/18 |
|  |  |  |  |  | 73/514.16 |

(Continued)

*Primary Examiner* — David J Bolduc
(74) *Attorney, Agent, or Firm* — Loppnow & Chapa; Matthew C. Loppnow

(57) ABSTRACT

A MEMS device can include a substrate having a first side and a second side, the substrate including an aperture extending from the first side through the substrate to the second side. The device can include a support structure coupled to the substrate the first side. The device can include a resilient structure coupled to the support structure. The device can include a rigid movable plate coupled to the support structure via the resilient structure and positioned over the aperture. The device can include a proof mass coupled to the movable plate, the proof mass extending into the aperture. The device can include an electrode located on an opposite side of the movable plate from the proof mass.

17 Claims, 16 Drawing Sheets

(56) References Cited

U.S. PATENT DOCUMENTS

| | | | |
|---|---|---|---|
| 2006/0219006 A1* | 10/2006 | Nasiri | G01C 19/56 73/504.12 |
| 2006/0272413 A1* | 12/2006 | Vaganov | G01P 15/18 73/514.01 |
| 2007/0214888 A1* | 9/2007 | Nomura | G01P 15/0802 73/514.01 |
| 2008/0123876 A1* | 5/2008 | Sato | H04R 19/016 381/174 |
| 2009/0064780 A1* | 3/2009 | Coronato | G01P 15/125 73/504.08 |
| 2009/0237275 A1* | 9/2009 | Vaganov | G06F 3/0338 341/20 |
| 2010/0005886 A1* | 1/2010 | Aida | B81B 3/0081 29/25.35 |
| 2011/0215067 A1* | 9/2011 | Nomura | G01P 15/0802 216/11 |
| 2012/0297874 A1* | 11/2012 | Kim | G01C 19/56 73/504.12 |
| 2012/0312096 A1* | 12/2012 | Jeung | G01C 19/5783 73/514.01 |
| 2013/0081464 A1* | 4/2013 | Park | G01C 19/5783 73/504.12 |
| 2013/0167640 A1* | 7/2013 | Lim | G01C 19/5783 73/514.01 |
| 2014/0150552 A1* | 6/2014 | Feyh | G01C 19/5769 29/25.35 |
| 2015/0276533 A1* | 10/2015 | Belov | G01L 19/0618 324/252 |
| 2016/0216290 A1* | 7/2016 | Tang | G01P 15/125 |
| 2016/0370397 A1* | 12/2016 | Lin | G01P 1/003 |
| 2017/0144881 A1* | 5/2017 | Baldo | B81B 3/0072 |
| 2017/0156002 A1* | 6/2017 | Han | H04R 31/006 |
| 2017/0341927 A1* | 11/2017 | Pekka Herzogenrath | B81C 1/00476 |
| 2020/0196065 A1 | 6/2020 | Pedersen et al. | |
| 2020/0216305 A1* | 7/2020 | Rizzini | G01C 19/5712 |
| 2020/0245053 A1 | 7/2020 | Pedersen et al. | |
| 2020/0319228 A1* | 10/2020 | Li | G01L 19/0092 |

* cited by examiner

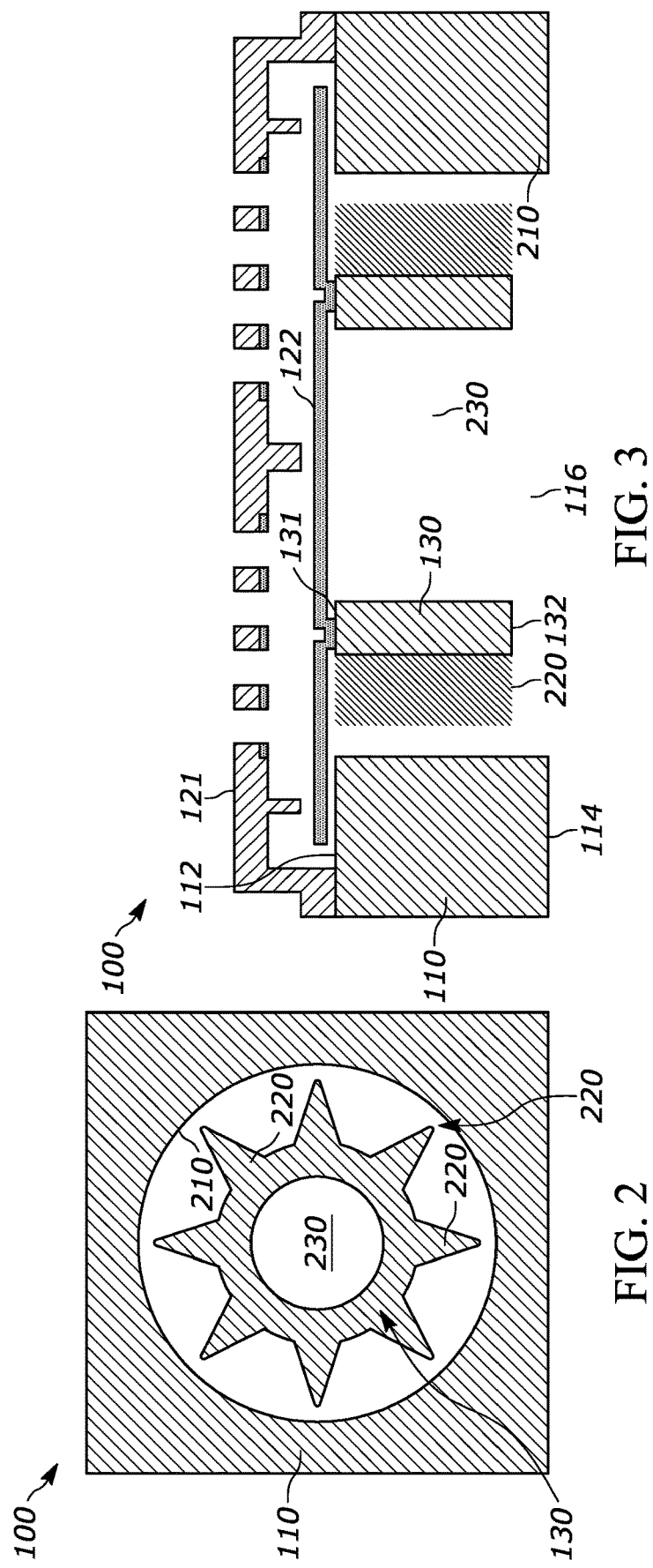

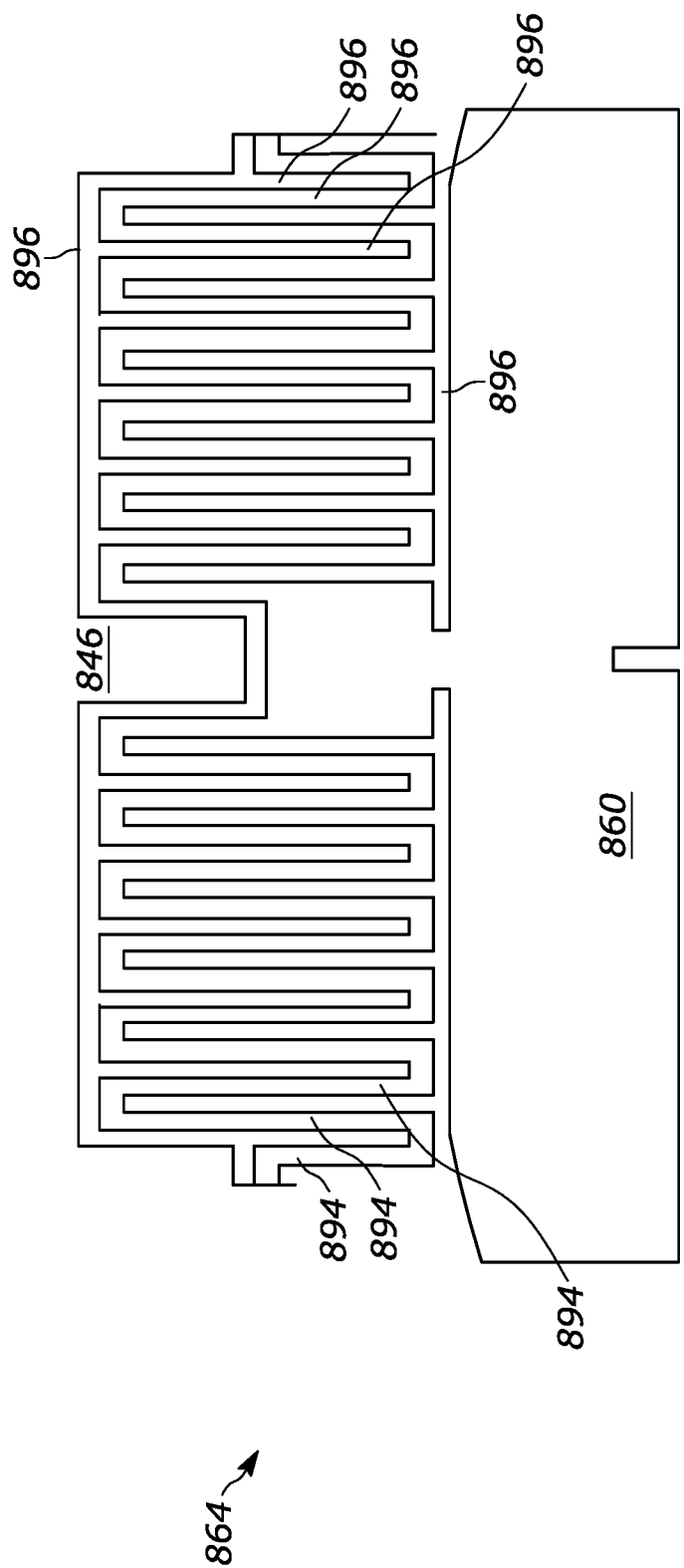

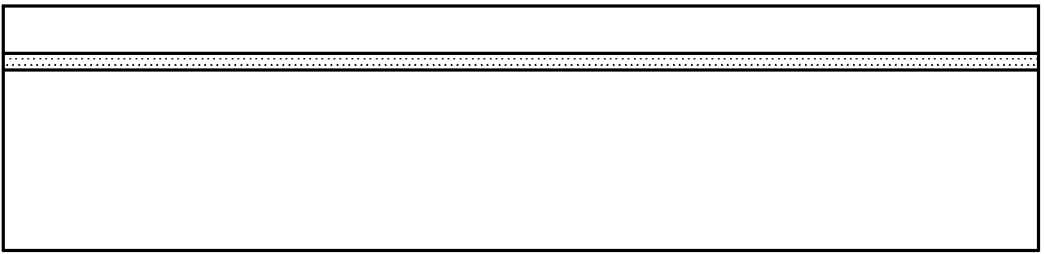
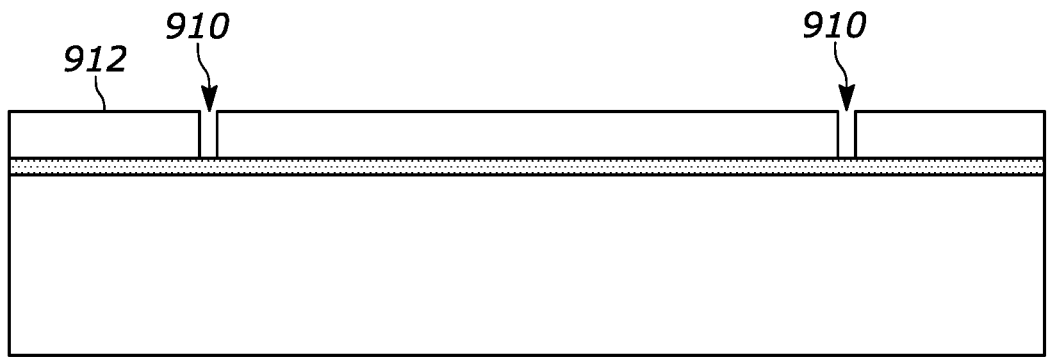
FIG. 17A
FIG. 17B
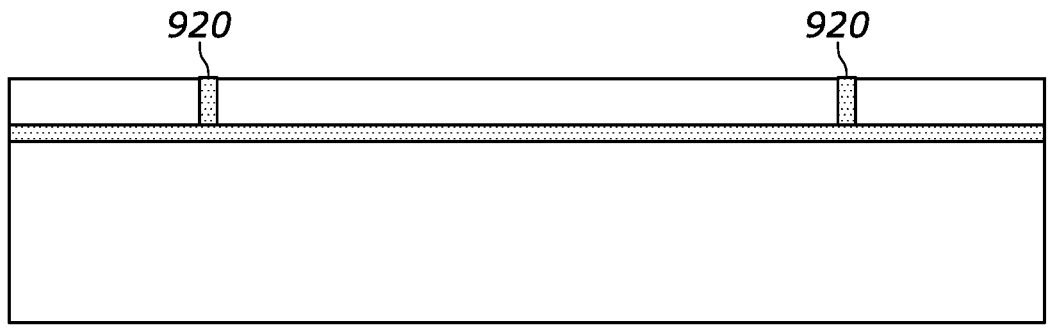
FIG. 17C

MICROELECTROMECHANICAL SYSTEMS DEVICE INCLUDING A PROOF MASS AND MOVABLE PLATE

BACKGROUND

1. Field

The present disclosure relates generally to Microelectromechanical Systems (MEMS) transducer assemblies including a proof mass and movable plate.

2. Introduction

Presently, MEMS sensors can be used in electronic devices to detect movement of the devices, to detect sound, and for other purposes. Advancements in micro and nano-fabrication technologies have led to the development of progressively smaller MEMS sensors. MEMS sensors can be incorporated into compact devices such as cell phones, laptops, smart watches, headphones, other compact devices, as well as other devices in general. This is because MEMS sensors are relatively small, which is useful when space is at a premium in various devices.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore considered to limit its scope. The drawings may have been simplified for clarity and are not necessarily drawn to scale.

FIG. 2 is a top sectional view of a vibration sensor die, according to a possible embodiment;

FIG. 3 is a side cross-section view of a vibration sensor die, according to a possible embodiment;

FIG. 16A-16C are elevated views of a resilient structures (shown attached at one end to a movable plate) according to possible embodiments;

FIG. 17A through FIG. 17I depict fabrication steps for making a vibration sensor die, according to a possible embodiment.

DETAILED DESCRIPTION

Figure 1:
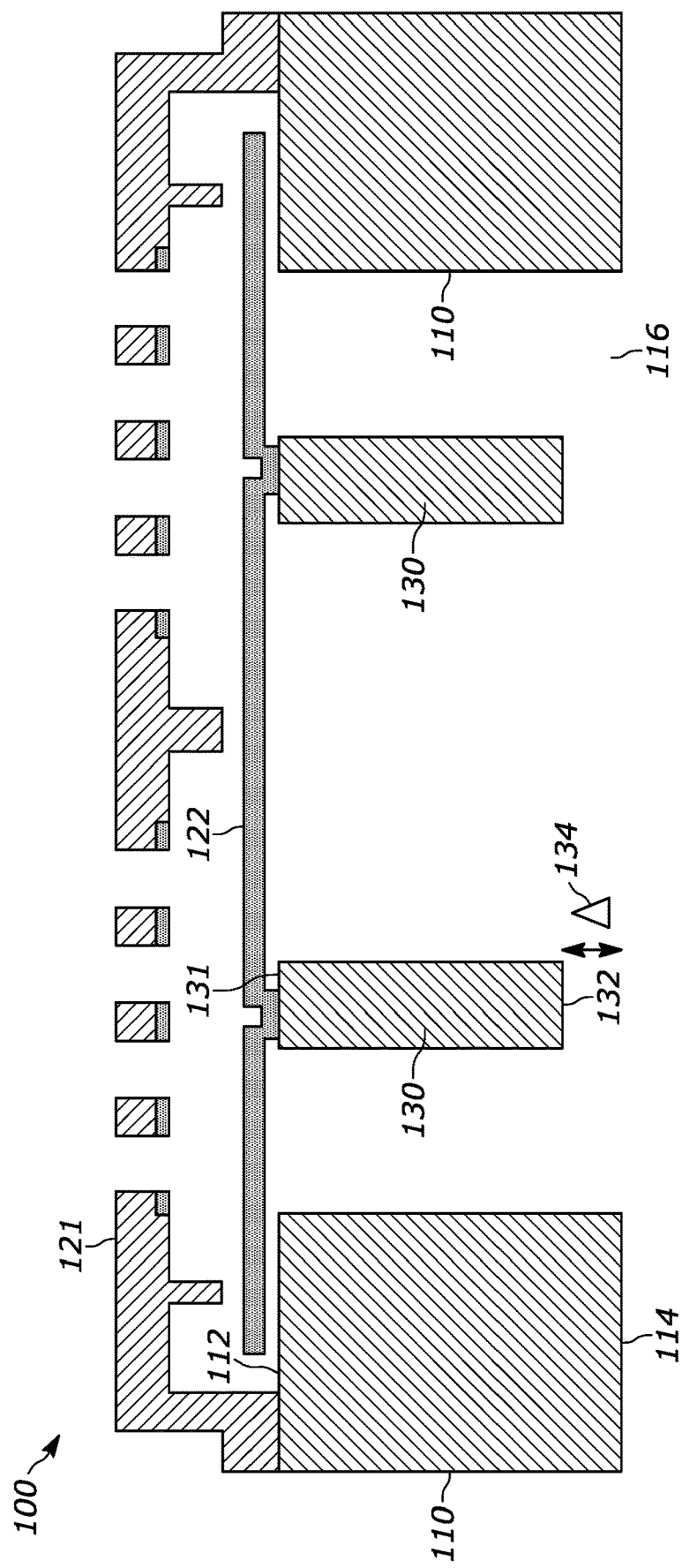
FIG. 1 is a side cross-section view of a vibration sensor die, according to a possible embodiment.

At least some embodiments can provide a MEMS device. The device can include a substrate having a first side and a second side, the substrate including an aperture extending from the first side through the substrate to the second side. The device can include a support structure coupled to the substrate the first side. The device can include a resilient structure coupled to the support structure. The device can include a rigid movable plate coupled to the support structure via the resilient structure and positioned over the aperture. The device can include a proof mass coupled to the movable plate, the proof mass extending into the aperture. The device can include an electrode located on an opposite side of the movable plate from the proof mass.

At least some embodiments can provide a MEMS vibration sensor die. The die can include a substrate having a top portion, a mounting surface, and an aperture extending at least partially through the substrate. The die can include a first electrode coupled to the top portion of the substrate and positioned over the aperture. The die can include a second electrode disposed between the substrate and the first electrode. The second electrode can be spaced apart from the first electrode. The die can include a proof mass. The proof mass can have a first portion coupled to the first electrode or the second electrode. The proof mass can have a second end opposite the first portion. The second end can be recessed within the aperture relative to the mounting surface of the substrate. The proof mass can be suspended freely within the aperture. The proof mass can move the first electrode or the second electrode from which it is suspended in response to vibration. In some implementations, the die comprises a semiconductor material and is fabricated using photolithographic processes known to those of ordinary skill in the art.

At least some embodiments can provide for vibration sensor robustness. For example, a proof mass in the vibration sensor can be confined to prevent fracture of an electrode, such as a polysilicon diaphragm, in situations when the sensor is shocked from an impact. For example, a vibration sensor can include a relatively large proof mass coupled to a diaphragm and certain forces can damage the diaphragm or proof mass. Also, large deflections may cause the diaphragm to collide with a back plate and/or break the diaphragm, back plate, or a runner connecting the diaphragm to the substrate. Thus, in at least some implementations, the die can be configured to reduce or eliminate the likelihood of damage.

For example, at least some embodiments can provide structures added to a proof mass and/or the substrate to physically limit the vertical or lateral travel of the proof mass to within ranges that will not cause damage. This can provide for shock robustness of a vibration sensor, which can also be used as an accelerometer. In at least some embodiments, the proof mass can be recessed relative to a mounting surface of the substrate to prevent damage during fabrication and singulation of the die from a wafer and during assembly of the die onto a base or substrate of the sensor package.

Referring to different possible embodiments shown in FIGS. 1-7, a MEMS vibration sensor die 100 can include a substrate 110 and a proof mass 130. The die 100 can include and/or can be formed of multiple substrates, one or more dielectric layers, one or more metal layers, one or more semiconductors, one or more layers of material forming the substrate, and/or other materials.

Referring to the different possible embodiments shown in FIGS. 1, 3, 5, and 7, the die 100 can include a first electrode 121, and a second electrode 122, at least one of which move relative to the other during operation. The moving electrode may be the first electrode or second electrode and be of the free-plate type or the constrained-plate type. According to a possible implementation, the first electrode 121 can be a back plate and the second electrode 122 can be a diaphragm. The substrate 110 can also include an aperture 116 extending at least partially through the substrate.

Figures 4, 5:
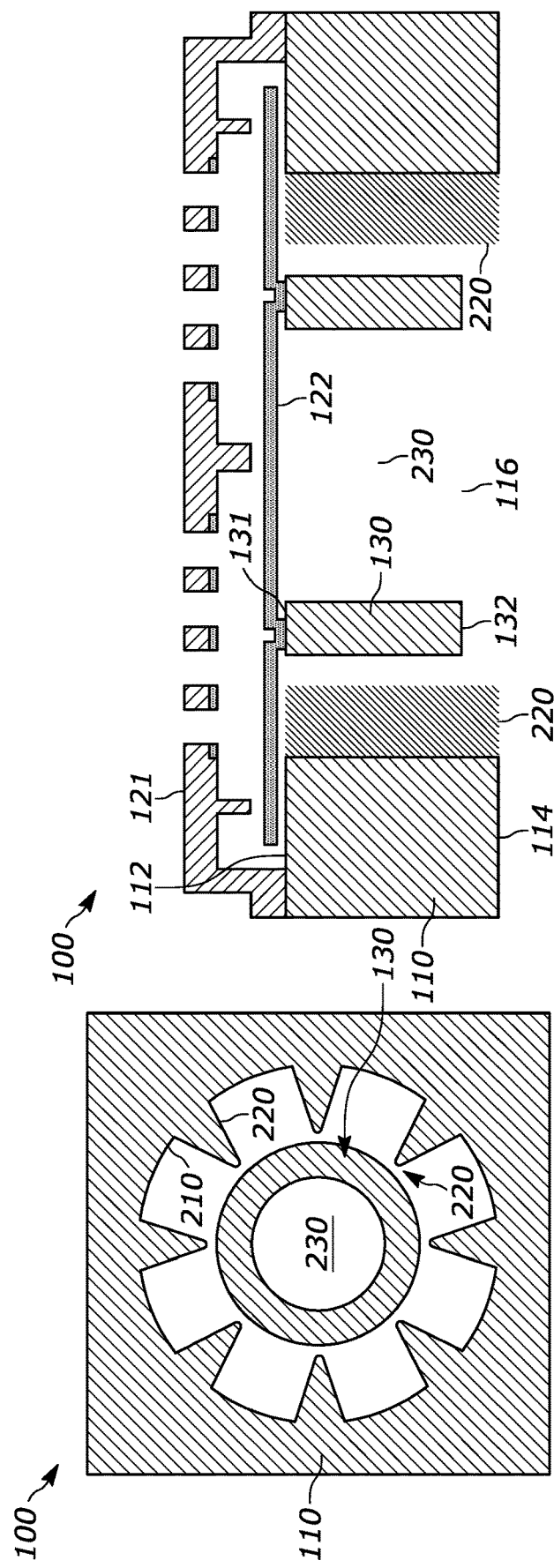
FIG. 4 is a top sectional view of a vibration sensor die, according to a possible embodiment.
FIG. 5 is a side cross-section view of a vibration sensor die, according to a possible embodiment.

Referring to the different possible embodiments shown in FIGS. 1, 3, and 5, the substrate 110 can have a top portion 112, a mounting surface 114, and an aperture 116 extending at least partially through the substrate 110. The first electrode 121 can be coupled to the top portion 112 of the substrate 110 and positioned over the aperture 116. The second electrode 122 can be disposed between the substrate 110 and the first electrode 121. The second electrode 122 can be spaced apart from the first electrode 121.

The proof mass 130 can have a first portion 131 coupled to the first electrode 121 or the second electrode 122. In the illustrated embodiments, the first portion 131 is shown coupled to the second electrode 122. The proof mass 130 can have a second end 132 opposite the first portion 131. The proof mass 130 can be suspended freely within the aperture 116. The proof mass 130 can move the first electrode 121 or the second electrode 122 from which it is suspended in response to vibration.

Referring to a possible embodiment of FIG. 1, the second end 132 can be recessed 134 within the aperture 116 relative to the mounting surface 114 of the substrate 110. According to a possible implementation, a height of the proof mass 130 can be etched back, so that the proof mass is recessed relative to the substrate 110. In one implementation, the height of the proof mass 130 can be reduced 134 by an amount between 10 um to at least 50 um. In other implementations, the extent to which the proof mass is recessed can be different depending on the size of the proof mass and other part of the die, specified range of motion of the proof mass, intended use case, etc.

According to one aspect of the disclosure, the die can include a lateral support member adjacent the proof mass, wherein the lateral support member limits movement of the proof mass in a direction non-parallel to a direction of movement of the first or second electrode to which the proof mass is coupled. Referring to possible embodiments of FIGS. 2-5, part of the substrate. The lateral support member 210 can be part of the substrate 110. Alternatively, the lateral support member can be another member located between the substrate and the proof mass, or a fixed member about which the proof mass is disposed. Spacing between the proof mass 130 and the lateral support member 210 can be such that the lateral support member 210 can prevent the proof mass 130, or first electrode 121 or second electrode 122 to which it is coupled, from fracturing. The specific dimensions of the spacing can depend on the size of the proof mass and other parts of the die, specified range of motion, intended use case, etc.

According to a possible embodiment, the die 100 can include a plurality of protrusions 220. The plurality of protrusions 220 can extend from the substrate 110 toward the proof mass 130 as shown in FIGS. 4 and 5 or from the proof mass 130 toward the substrate 110 as shown in FIGS. 2 and 3. The lateral support member 210 can be a part of the substrate 110 from which the protrusions 220 extend or a part of the substrate 110 toward which the protrusions 220 extend from the proof mass 130. For example, according to a possible embodiment, FIGS. 2 and 3 illustrate the protrusions 220 extending from the proof mass 130 toward the substrate 110. As another example embodiment, FIGS. 4 and 5 illustrate the protrusions 220 extending from the substrate 110 toward the proof mass 130. According to possible implementations the protrusions 220 can be fins, posts, cups, any other protrusion shapes. The protrusions 220 can be sized to minimize added mass, to maintain sensitivity, and/or to reduce lateral travel, such as to less than 15 um.

According to a possible embodiment, the proof mass 130 can have a hollow portion 230 and the substrate 110 can substantially surround the proof mass 130. The proof mass 130 and the substrate 110 can have any generally complementary shapes. According to a possible implementation, a lateral support member can be inside the hollow portion 230 of the proof mass 130.

Figure 6:
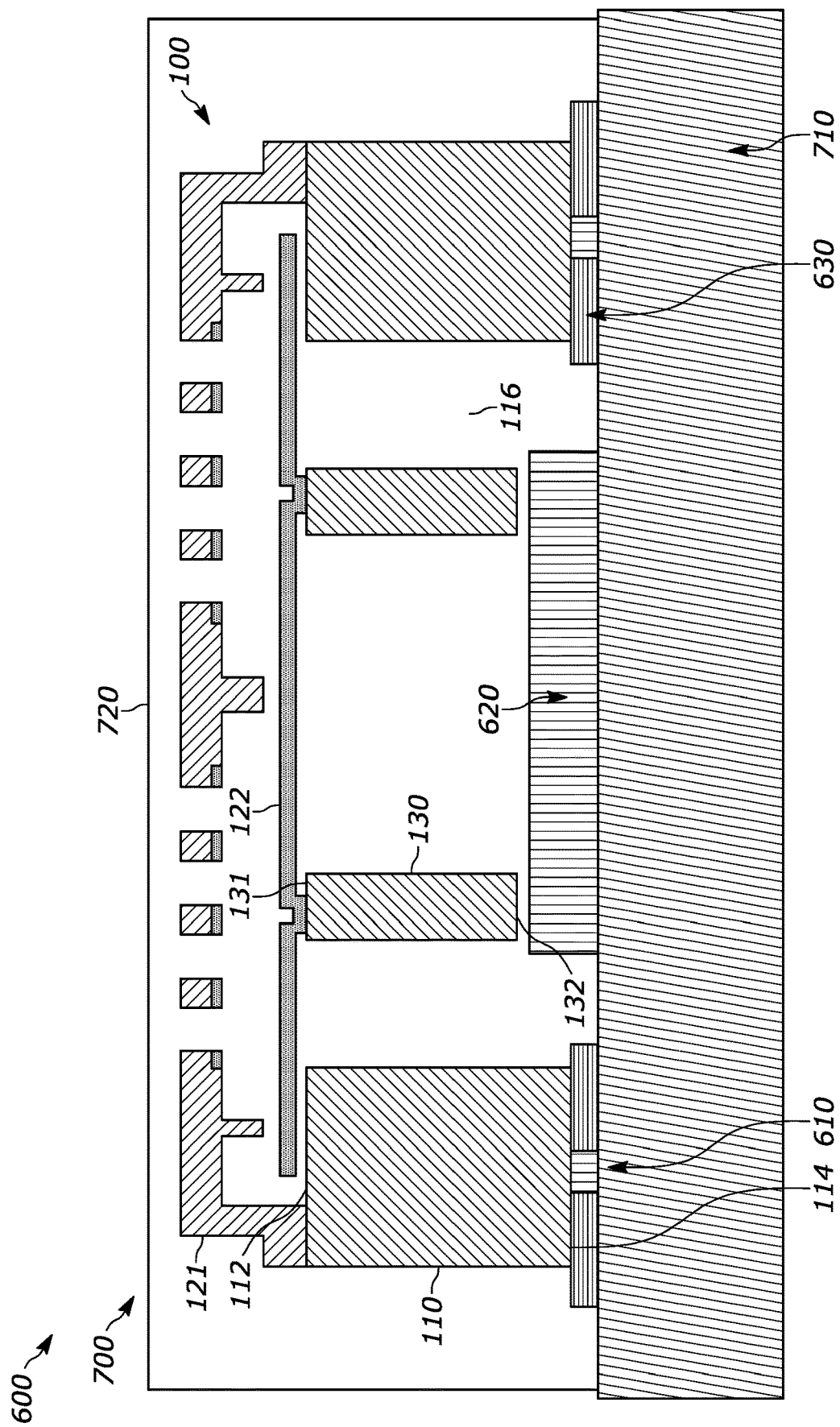
FIG. 6 is a side cross-section view of a vibration sensor assembly including the vibration sensor die of FIG. 1, according to a possible embodiment.

FIG. 6 is a side cross-section view of a vibration sensor assembly 600 including the vibration sensor die 100, according to a possible embodiment. The die 100 can include at least one rigid post 610 protruding from the mounting surface 114 of the substrate 110. The post 610 can be formed integrally with the substrate 110. The post can also be formed integrally with the base portion 710 or can be separate from the substrate 110 and the base portion 710. According to a possible embodiment, the post 610 can reduce variation in thickness of a die attach, like adhesive 630, that can couple the substrate 110 to the base portion 710. The at least one rigid post 610 can be embedded in the adhesive 630 and disposed between the mounting surface 114 of the substrate 110 and the base portion 710. The post shown has a uniform cross-section, but it can also have other shapes (e.g., tapered, tetrahedron, etc.) suitable for MEMS die fabrication processes.

According to a possible embodiment, the die 100 can be in combination with a MEMS sensor housing 700 comprising a lid or cover mounted on a base portion 710. The mounting surface 114 of the substrate 110 can be mounted on the base portion 710, such as via the adhesive 630, and the aperture 116 can extend fully through the substrate 110. The proof mass 130 can be disposed in the aperture 116 between the base portion 710 and the first electrode 121. According to a possible embodiment, the housing 700 can also include a lid 720.

According to a possible embodiment, the die 100 can include a displacement-limiting support member 620 that can be coupled to the base portion 710. The displacement-limiting support member 620 can be integral with the die 100, such as by being part of the substrate 110. For example, displacement-limiting support member 620 can be fabricated by bonding two separate dies after etching the desired structures, such as by a die bonding process. According to a possible implementation, the displacement-limiting support member 620 can be coupled to the substrate 110. The displacement-limiting support member 620 can be located beneath and spaced apart from the proof mass 130. The displacement-limiting support member 620 can limit displacement of the proof mass 130 in a direction of movement of the first electrode 121 and/or the second electrode 122 to which the proof mass 130 is coupled.

According to a possible implementation, the displacement-limiting support member 620 can be separate from the die 100. For example, the displacement-limiting support member 620 can be a copper pillar, can be a silicon pillar, can be a glass pillar, can be fabricated from the same material as the base portion 710, or can be made from any other material. According to a possible implementation, the displacement-limiting support member 620 can be larger in height than the post 610.

Figure 7:
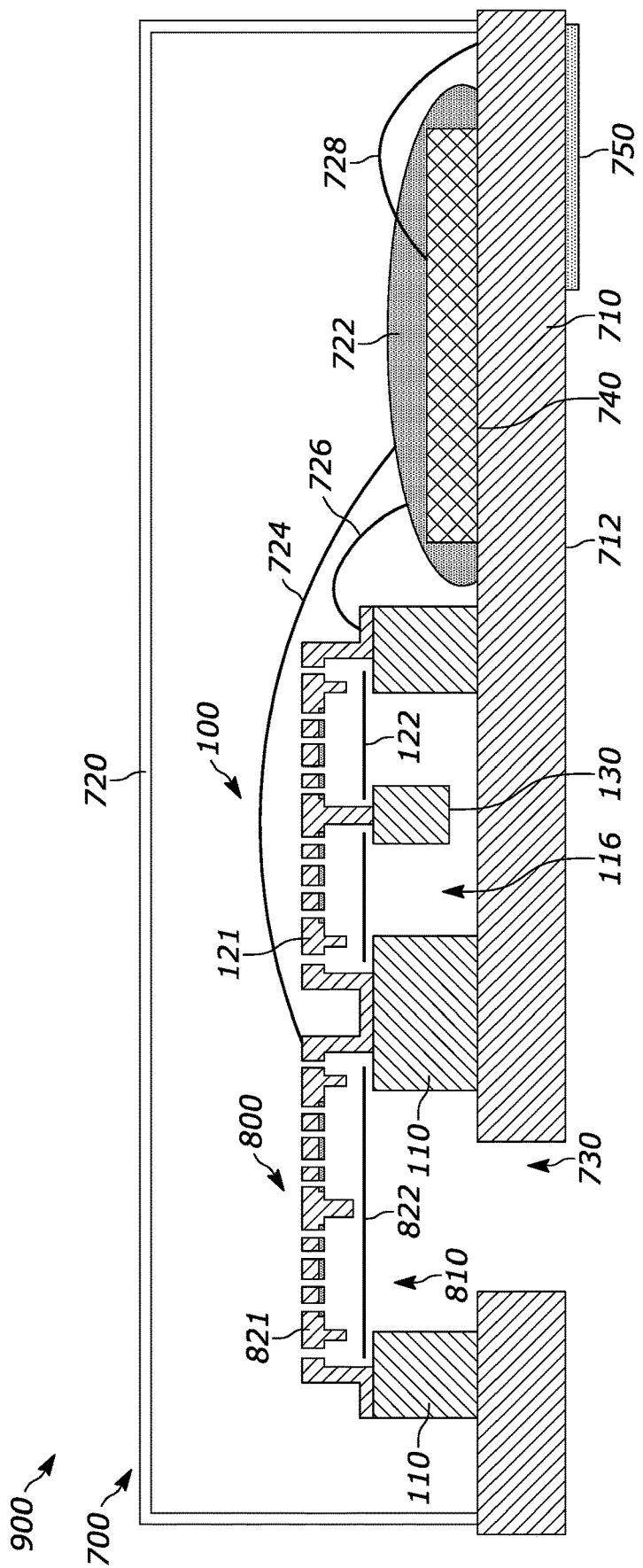
FIG. 7 is a schematic illustration of a microphone assembly including the vibration sensor die of FIG. 1, according to a possible embodiment.

FIG. 7 is a schematic illustration of a microphone assembly 900 including the vibration sensor die 100 and the housing 700, according to a possible embodiment. While the proof mass 130 is illustrated as a solid proof mass in this embodiment, it can also be of any other form, such as shown in the preceding embodiments. Similarly, this embodiment and other embodiments can include or exclude other aspects of the other embodiments.

The housing 700 can include the lid 720 mounted on the base portion 710. The microphone assembly 900 can also include an integrated circuit 740 disposed in the housing 700. The integrated circuit 740 can be electrically coupled to the vibration sensor die 100 and to electrical contacts on a surface-mount interface 750 disposed on an external surface 712 of the base portion 710.

According to possible embodiments, the surface-mount interface 750 can have a plurality of contacts coupled to the integrated circuit 740, such as to connection pads, such as bonding pads, which can be provided on the integrated circuit 740. The contacts may be embodied as pins, pads, bumps, balls, and/or other structures. The functions and number of contacts on the surface-mount interface 750 can depend on the protocol or protocols implemented and may include power, ground, data, and clock contacts among others. The surface-mount interface 750 can permit integration of the microphone assembly 900 with a host device using reflow-soldering, fusion bonding, or other assembly processes.

According to a possible embodiment, the microphone assembly 900 can include an acoustic sensor 800. The aperture 116 can be a first aperture 116 and the acoustic sensor 800 can include a second aperture 810 extending through a second portion of the substrate 110. The acoustic sensor 800 can include a first acoustic electrode 821 coupled to the substrate 110 and positioned over the second aperture 810. The acoustic sensor 800 can include a second acoustic electrode 822 disposed between the substrate 110 and the first acoustic electrode 821. The second acoustic electrode 822 can be spaced apart from the first acoustic electrode 821. The first acoustic electrode 821 or second acoustic electrode 822 can be movable relative to the other in response to sound.

According to a possible embodiment, the housing 700 can have a sound port 730 acoustically coupled to the second aperture 810 of the substrate 110. The sound port 730 can be in the base portion 710, in the lid 720, or anywhere else on the housing 700. The acoustic sensor 800 can be positioned on the sound port 730 such that the second aperture 810 is aligned with the sound port 730 to allow reception of an acoustic signal received through the sound port 730.

According to a possible embodiment, the integrated circuit 740 can be positioned on the base portion 710 and can be electrically coupled to the acoustic sensor 800, to the vibration sensor 100, and to electrical contacts on a surface-mount interface 750 disposed on the external surface 712 of the base portion 710. For example, the integrated circuit 740 can be electrically coupled, e.g., wire bonded, to the acoustic sensor 800, such as via a first electrical lead 724, and to the vibration sensor 100 via second electrical lead 726. The integrated circuit 740 can also be coupled to the base portion 710, such as to a trace or other electrical contact disposed on the base portion 710, via a third electrical lead 728. The integrated circuit 740 can receive an electrical signal from the acoustic sensor 800 and the vibration sensor 100. According to a possible implementation, the base portion 710 can include a Printed Circuit Board (PCB) configured to mount the vibration sensor die 100, the acoustic sensor 800, the integrated circuit 740, and the lid 720 thereon.

In some implementations, an encapsulant 722 can be disposed on the integrated circuit 740. The encapsulant can include, for example an epoxy or other material that protects the integrated circuit from moisture and/or dissipates heat.

The vibration sensor 100, the acoustic sensor 800, and the integrated circuit 740, are shown disposed on a surface of the base portion 710. In other embodiments one or more of these components may be disposed on the lid 720, on an inner surface of the lid 720, on sidewalls of the lid 720, and/or stacked atop one another.

As previously noted, the second electrode 122 may be implemented as a diaphragm. In order to provide for a more robust construction than a diaphragm, the second electrode 122 may alternatively be implemented as a thick, rigid plate. Such a plate may be made of a variety of materials, such as single crystal Si in a Silicon-on-Insulator (SOI) wafer or poly Si from deposition. In general, such a plate can be thicker than a diaphragm implementation (e.g., about 10 times thicker than that of a diaphragm (~15 μm plate versus a ~1.5 μm diaphragm). In terms of flexural rigidity, a plate can be, for example, three orders of magnitude higher than a diaphragm. In other words, the plate can have much less compliance and be rigid under a vibration load. Various rigid plate implementations of a vibration sensor MEMS die (including resilient structures) according to various embodiments are depicted in FIGS. 8-15, 16A-16C, and 17A-17I.

Figure 8:
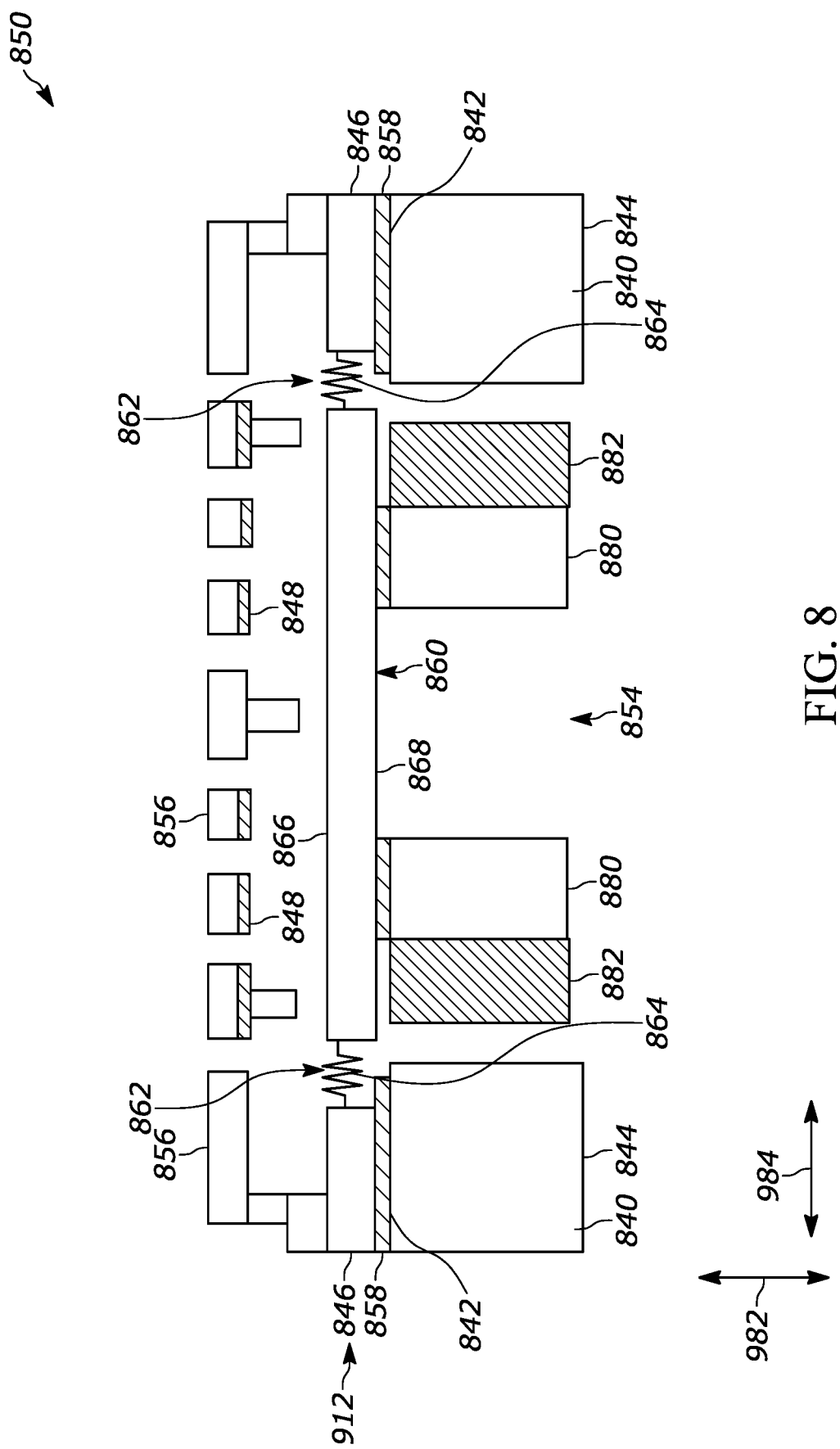
FIG. 8 is a side cross-section view of a vibration sensor die, according to a possible embodiment.
Figure 9:
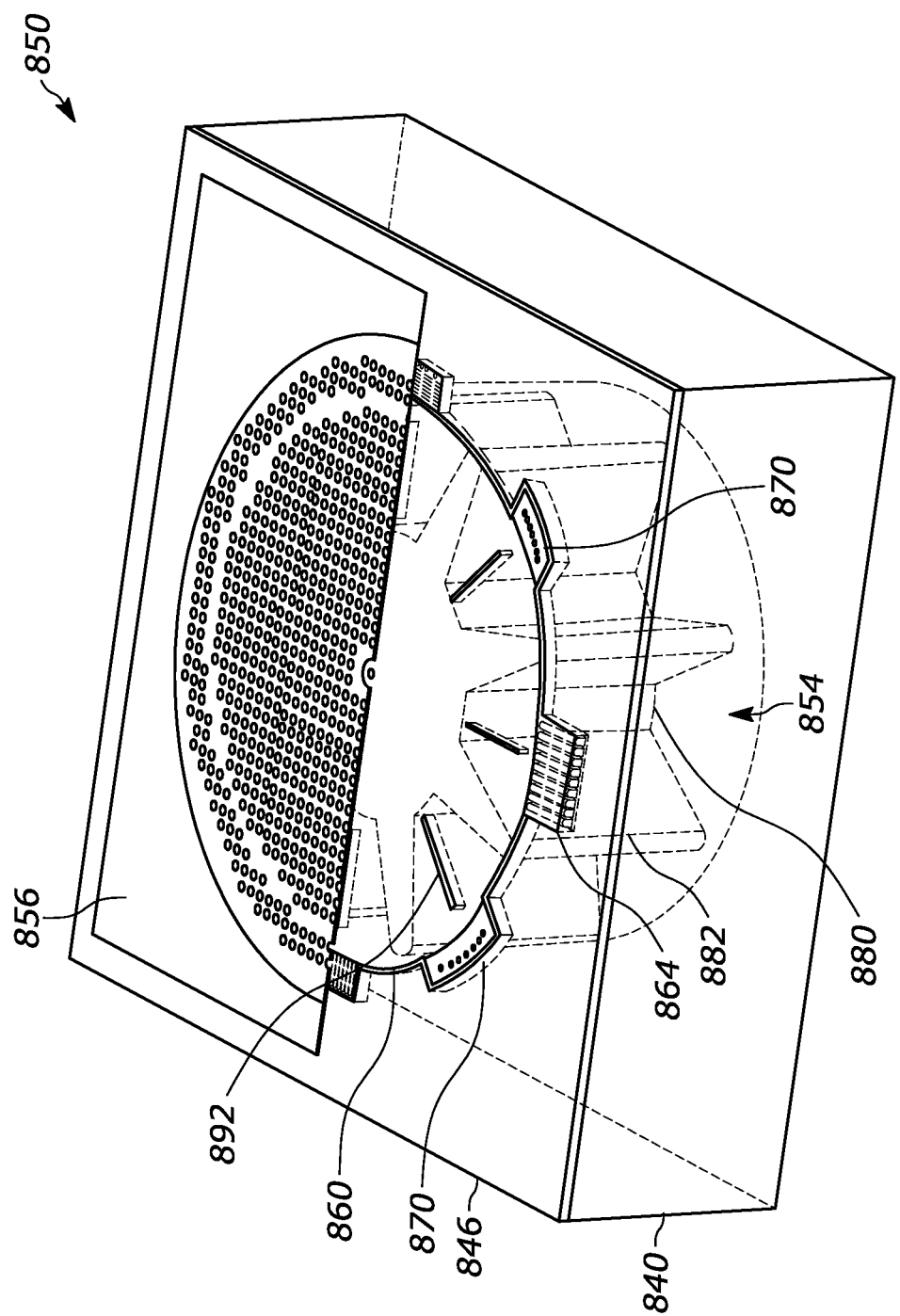
FIG. 9 is a perspective view of the vibration sensor die of FIG. 8 (with part of a fixed plate removed) according to a possible embodiment.
Figure 10:
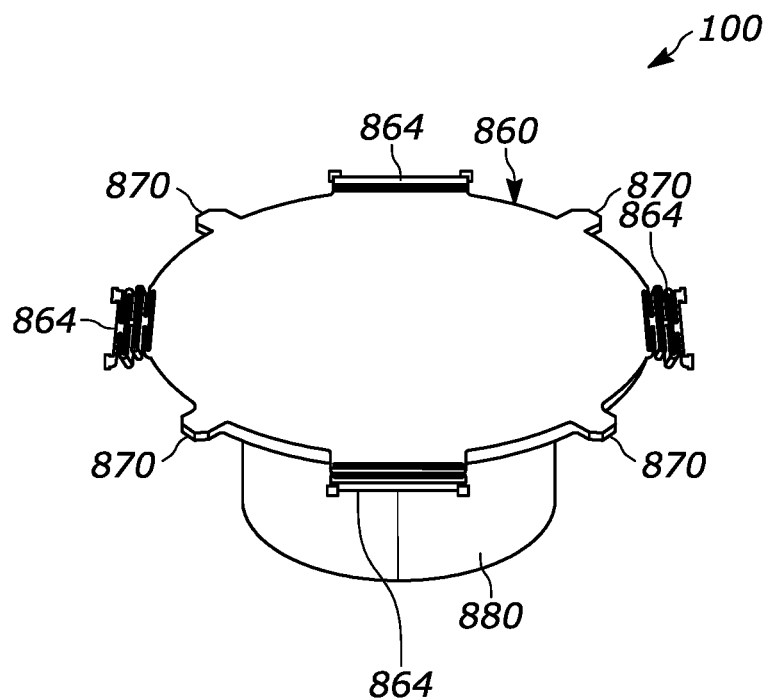
FIG. 10 is a perspective view of a movable plate, proof mass (without protrusions), and resilient structures that can be used in the vibration sensor die of FIG. 8 according to a possible embodiment.
Figure 11:
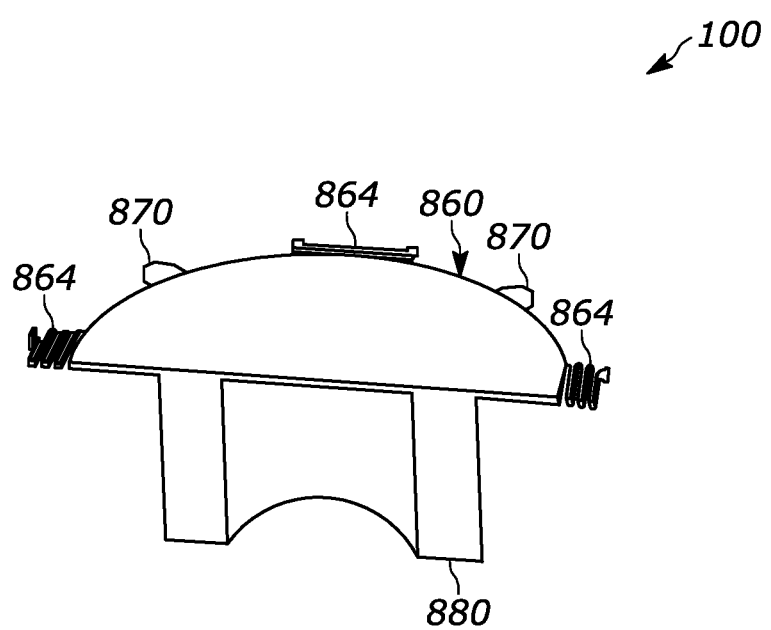
FIG. 11 is a cutaway view of the assembly depicted in FIG. 10, according to a possible embodiment.

Turning to FIGS. 8 and 9, a MEMS die, generally labelled 850, includes a substrate 840 having a first side 842 and a second side 844. The substrate 840 also includes an aperture 854 extending at least partially therethrough, such as from the first side 842 through the substrate 840 to the second side 844. The MEMS die includes a fixed support structure 846 coupled to the substrate first side 842, such as via a spacer layer 858.

The MEMS die 850 includes an electrically-conductive, fixed plate 856 (e.g., a backplate implemented as described above with respect to the first electrode 121) attached to the first side 842 of the substrate 840 (implemented, for example, as described above with respect to the substrate 110) and fixed relative to the substrate 840. According to a possible implementation, the fixed plate 856 is entirely conductive to act as an electrode. According to another possible implementation, a portion 848 of the fixed plate is conductive to act as the electrode. For example, the fixed plate 856 can comprise the electrode by being one entirely electrically-conductive plate or can include the electrode 848 among other elements of the fixed plate 856. According to a possible embodiment, the fixed plate 856 can include a plurality of layers where at least one layer, such as the portion 848, can be a conductor and at least one layer can be an insulator. According to another possible embodiment, the fixed plate 856 can have electrically conductive material deposited thereon.

The MEMS die 850 includes a rigid movable plate 860 coupled to the support structure 846 via at least one resilient structure 864 and positioned over the aperture 854. The movable plate 860 can be an electrically-conductive, rigid, movable plate 860 facing and generally parallel to the fixed plate 856 and the fixed plate 856 can be on an opposite side of the movable plate 860 from the proof mass 880. The fixed plate 856 and the movable plate 860 in some illustrated embodiments are generally circular, but they need not be. The fixed plate 856 may sometimes be referred to herein as a "first electrode," while the movable plate 860 may sometimes be referred to herein as a "second electrode."

The moveable plate 860 can be substantially rigid in that movement of the moveable plate 860 is allowed more by the resilient structure 864 than movement from flexing or bending of the moveable plate. To elaborate based on a possible embodiment, the moveable plate 860 can be used to detect vibration and can have a thickness that is approximately 10 times larger than, have less compliance than, and/or have a flexural rigidity that is 3 orders of magnitude larger than a more flexible plate that does not use a resilient structure 864. For example, the moveable plate 860 can use whole body displacement instead of local deformation, such as by having a body deformation of less than 10%, less than 5%, or less than any other useful amount for a rigid moveable plate of its overall displacement, under load. To the contrary, a flexible plate can deform up to and over 60% under load.

The movable plate 860 can be a single layer or can be a plurality of layers, which can include at least one insulator layer and at least one an electrically-conductive layer. For example, the movable plate 860 can be entirely one electrically-conductive plate or can include an electrically-conductive plate as a layer among other layers of the movable plate 860. To elaborate, the movable plate 860 can be made of several layers of which at least one is electrically conductive. According to a possible implementation, the movable plate 860 can be made from a thick insulating layer or a composite of layers with a thin conductive layer on top.

The moveable plate 860 is suspended at a first opening 862 of the aperture 854 by the at least one resilient structure 864, which is depicted in FIGS. 8 and 9 as springs. The at least one resilient structure 864 can be coupled to the support structure 846 and can provide compliant support and constraint to the movable plate 860 during vibration and, in an embodiment, can be fabricated from the same layer as the movable plate 860 and the support structure 846. For example, the resilient structure 864 can be made of the same material as the movable plate 860 and the support structure 846, such as by being part of a device layer 912 including the plate and the support structure. The resilient structure 864, the plate, and the support structure 846 can also be made of the same or different materials as the substrate 840.

The resilient structure 864 can be a compliant member, a flexible arm, a spring, or any other resilient structure that can be attached to and/or part of a movable plate to provide compliant support in one direction and constraint in another direction during plate movement, such as plate vibration. According to a possible embodiment, the movable plate 860 can vibrate with a resonance of between 6 kHz and 8 kHz. According to other possible embodiments, the movable plate 860 can vibrate at other desired frequencies based on the size, mass, and design of various elements of the MEMS die 850.

For example, the movable plate 860 can be substantially planar in a plane. The at least one resilient structure 864 can allow movement of the movable plate 860 in a direction perpendicular 982 to the plane and restrain movement in a direction parallel 984 to the plane. Movement in a direction parallel 984 to the plane can include lateral movement. According to a possible embodiment, design of the resilient structure 864 can allow for vertical movement perpendicular 982 to the plane to dominate over horizontal movement parallel 984 to the plane. According to another possible embodiment, the at least one resilient structure 864 restrains rotation of the movable plate 860 out of the plane. For example, the resilient structure 864 can restrict rocking of the movable plate 860 and proof mass 880. The resilient structure 864 can also provide for a lower vertical resonant frequency and a higher rocking resonant frequency.

According to a possible embodiment, the at least one resilient structure 864 can be multiple springs that can be symmetrically located around the movable plate 860. The springs can be made from the device layer 912 that includes the movable plate 860 and the support structure 846. The springs can provide compliant support to the proof mass 880. For example, the springs can provide more compliance in a vertical direction than lateral rotation compliance in a plane of the movable plate 860. Also, the resonance of a lateral rocking mode can be higher than that of a linear vertical mode of the movable plate 860.

The MEMS die 850 includes a proof mass 880 coupled to the movable plate 860 and extending into the aperture 854. For example, the moveable plate 860 has a first surface 866 that faces the fixed plate 856 and a second surface 868 that faces away from the fixed plate 856. The proof mass 880 is coupled to and suspended from the second surface 868 of the movable plate 860 so that it extends into the aperture 854. In response to vibration, the proof mass 880 and the movable plate 860 move, thereby changing the distance (and therefore the capacitance) between the fixed plate 856 and the movable plate 860. In some embodiments, a plurality of protrusions 882 extend from the proof mass 880 (also shown in FIG. 13). According to a possible embodiment, the MEMS die 850 can replace the vibration sensor die 100 in the microphone assembly 900 of FIG. 7.

Figure 12:
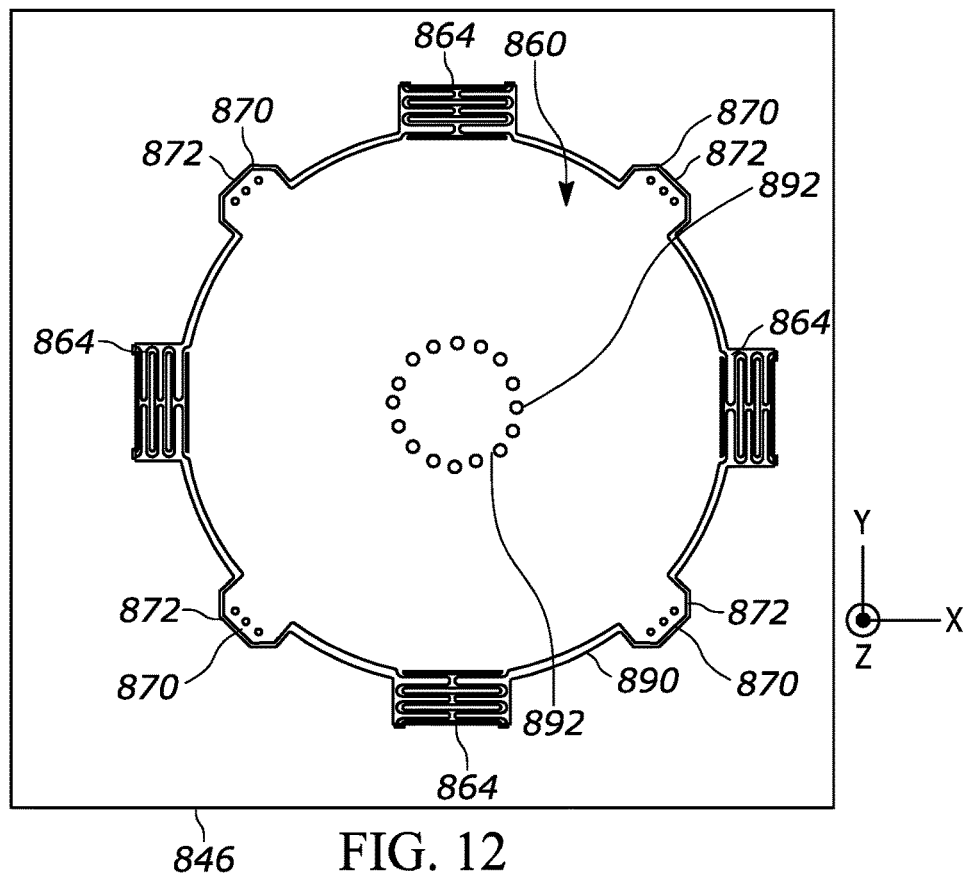
FIG. 12 is a top view of a movable plate, resilient members, and support structure, which can be used in the vibration sensor die of FIG. 8, according to a possible embodiment.
Figure 13:
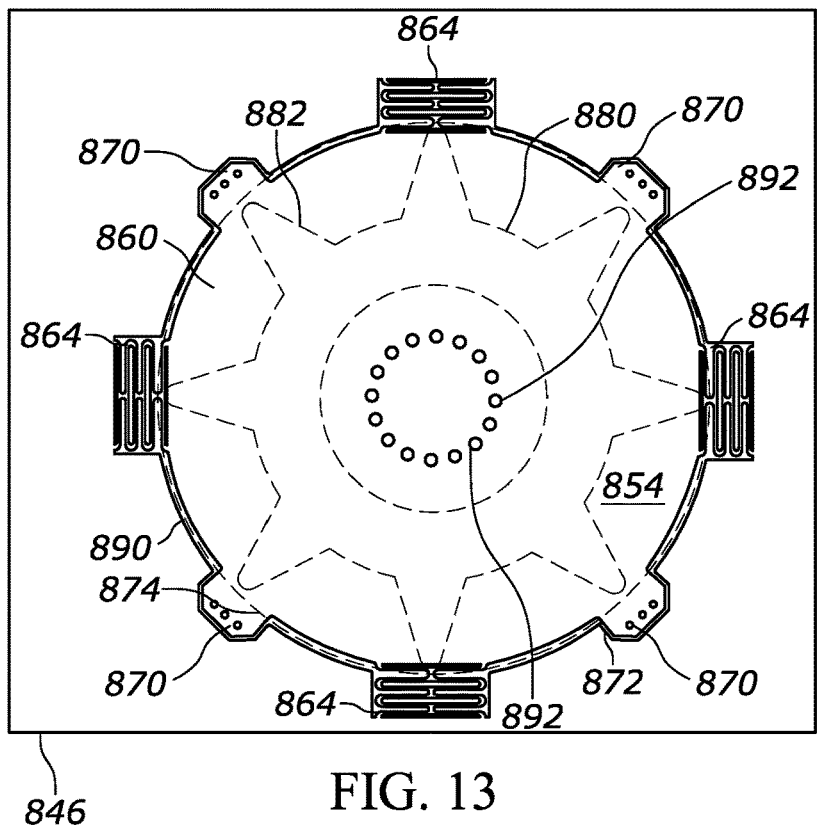
FIG. 13 is a top view of an assembly that includes a movable plate suspending a proof mass in an opening of an aperture of a substrate, which can be used in the vibration sensor die of FIG. 8 according to a possible embodiment.

Referring to FIGS. 9, 12, and 13 the movable plate 860 can also include at least one opening 892, which is shown as at least one slot in FIG. 9 and is shown as at least one circular hole in FIGS. 12 and 13. The at least one opening 892 can allow venting between the aperture 854 and an area on an opposite side of the movable plate 860 from the aperture 854, such as above the movable plate 860. The at least one opening 892 can control damping and frequency response of the movable plate 860. Referring to FIGS. 9-14, along with the resilient structures 864 and the attached proof mass 880, the movable plate 860 can include at least one stopper tab 870 extending out from an edge of the movable plate 860.

Turning to FIGS. 12 and 13, in an embodiment, a channel 890 is defined between the movable plate 860 and an inner surface of the support structure 846, such as at the first opening 862 of FIG. 8. Each of the at least one tab 870 is disposed in a complimentarily-shaped recess 872 within the support structure 846 and the channel 890. The combination of the tab 870 and the recess 872 can serve to limit the range of motion of the movable plate 860 along the x and y axes, such as by limiting rotational movement of the movable plate 860. For example, the at least one stopper tab 870 and the at least one recess 872 can allow movement in a direction perpendicular to a plane of the movable plate 860 and restrain movement parallel to the plane of the movable plate 860.

As with the resilient structure 864, the at least one tab 870 can be made of the same material as the movable plate 860 and the support structure 846, such as by being fabricated from the same layer as the movable plate 860 and support structure 846. The at least one tab 870 can restrict horizontal, such as lateral, and rotational movement in the plane and the plate can move, such as travel and rotate, as far as the distance in a gap between the at least one tab 870 and the recess 872. The movable plate 860 may not travel in the vertical direction more than a thickness of the at least one tab 870 and/or a thickness of the recess 872, which can retain the at least one tab 870 within the recess 872.

Figure 14:
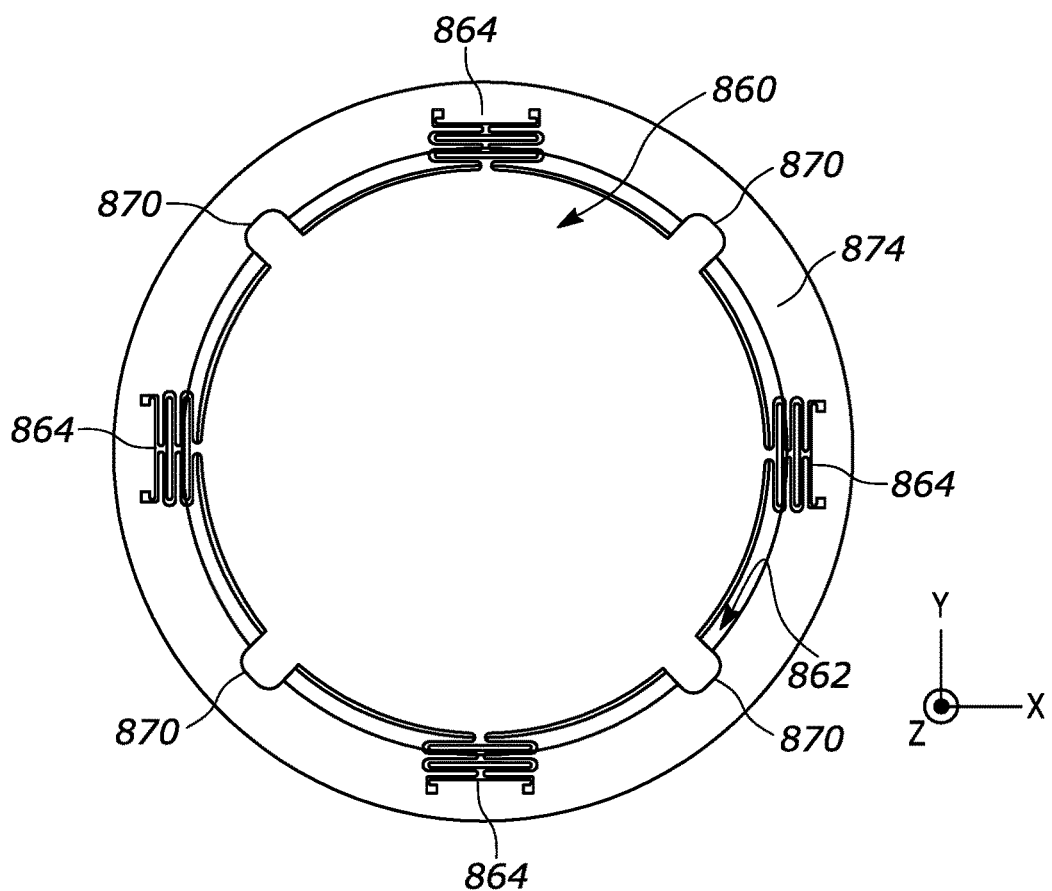
FIG. 14 is a top view of the assembly of FIG. 13, with the movable plate being over a ledge located at the opening of the aperture, according to a possible embodiment.

Turning to FIGS. 13 and 14, in an embodiment, the die 850 includes a ledge 874 proximate to the opening 862 of FIGS. 8 and 14. The ledge 874 can be coupled to the substrate 840 of FIG. 8. The at least one tab 870 can extend from the movable plate 860 beyond the opening 862 and over the ledge 874 so that when the movable plate 860 moves in response to vibration, the at least one tab 870 makes contact with the ledge 874 so that the ledge 874 limits the motion of the movable plate 860 (and therefore the motion of the proof mass 880) along the z-axis. For example, the ledge 874 can limit movement of the plate in a direction perpendicular to a plane of the plate. The ledge 874 can be made of the same material as the substrate 840 or can be made of different material from the substrate 840.

Figure 15:
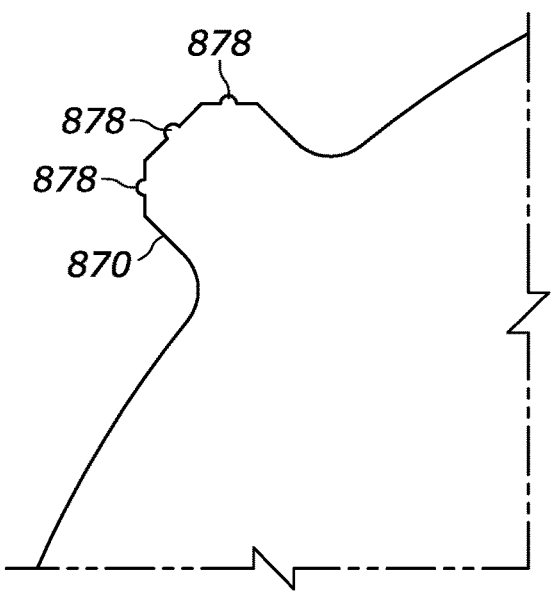
FIG. 15 is an elevated view of a tab with bumps according to a possible embodiment.

Turning to FIG. 15, in one implementation, each of the at least one tab 870 can have a series of bumps 878. The bumps 878 can help to achieve a gap in the range of ~1.5 to 2.0 μm between the tab 870 and the wall of the recess 872 of FIGS. 12 and 13. For example, the bumps 878 can extend into a gap between each at least one tab 870 and the corresponding recess 872 and can provide for a narrower gap between the at least one tab 870 and the recess 872. In the example embodiment, the gap between the at least one tab 870 and the recess 872 can be 2 um and the bumps 878 can extend into the gap to restrict movement of the plate in a horizontal direction to less than 2 um. In other embodiments with other dimensions of the MEMS die, the gap and bumps can be proportionally different. The gap also can take on other dimensions in the present embodiment, such as a range from 0.5 um-3 um or any other useful dimension. Similarly, the bumps 878 can take on other dimensions depending on the amount of movement desired between the at least one tab 870 and the recess 872.

Figure 16A:
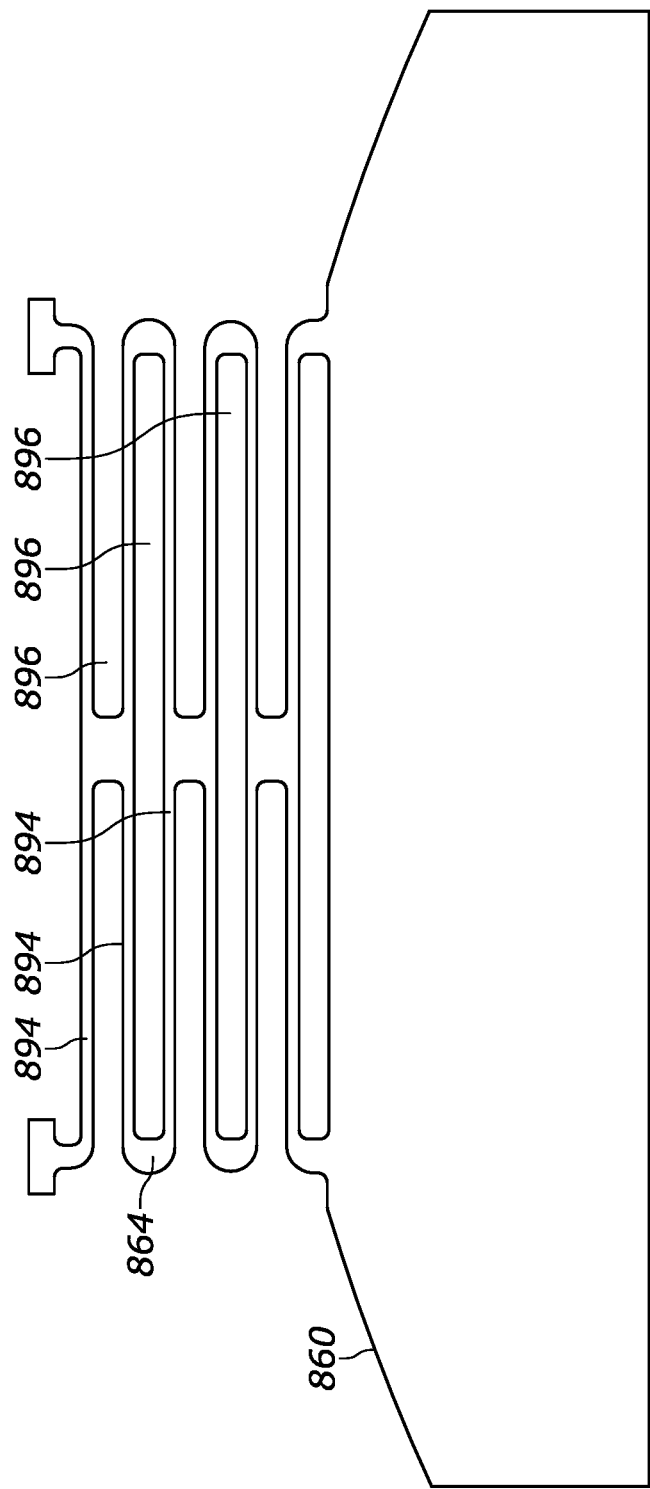
Figure 16B:
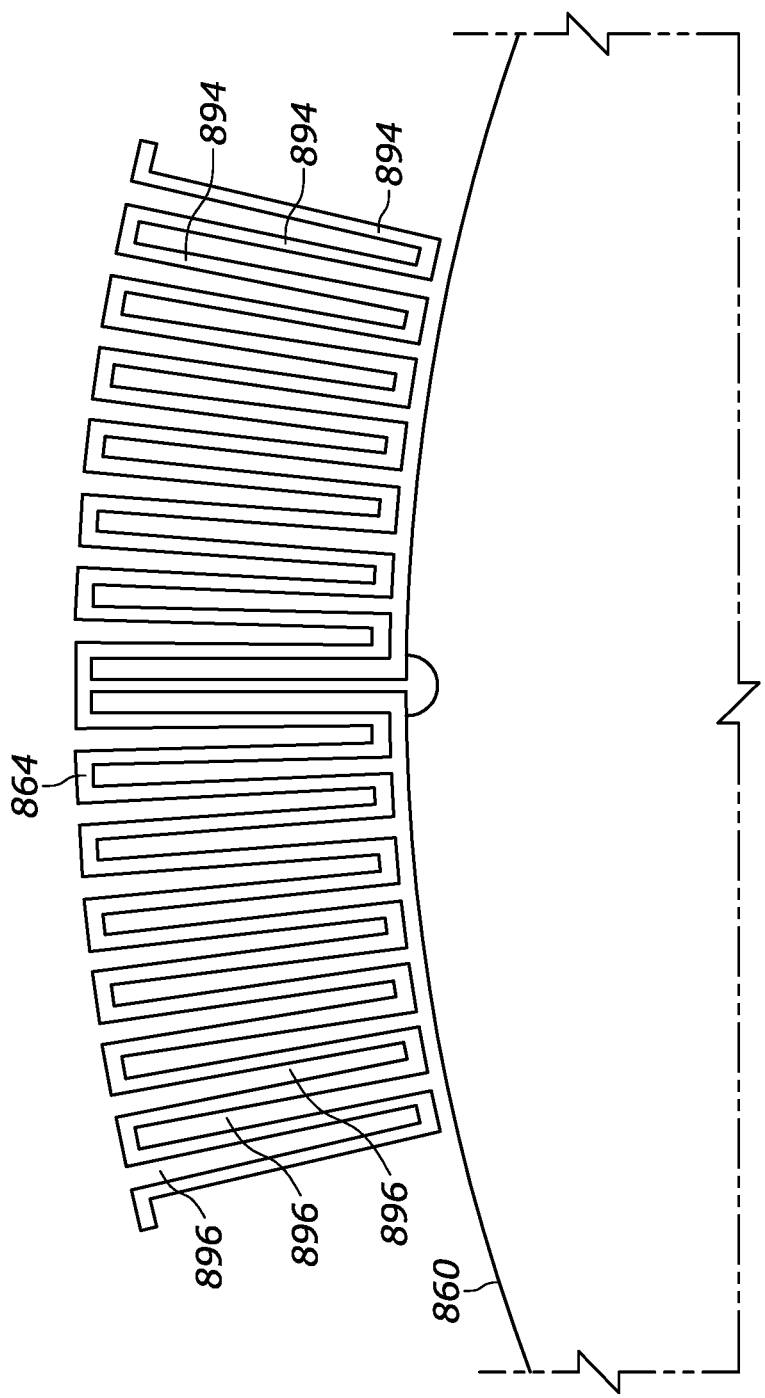

FIGS. 16A-16C are example illustrations of possible implementations of the resilient structure 864 connected to the movable plate 860. The resilient structure can be a spring that can include a plurality of resilient connecting arms 894. There can be a gap 896 with a constant width between the arms 894, which can be implemented for processing, such as for fabrication of the resilient structure 864. The resilient structure 864 can have different configurations. For example, referring to FIG. 16A, the resilient structure 864 can have a looped configuration. Referring to FIGS. 16B and 16C, different implementations of the resilient structures 864 can have different serpentine configurations. Referring to FIG. 16C the gap 896 can also have a constant width between the arms 894 and the movable plate 860, as well as between the arms 894 and the support structure 846.

Figure 17D:
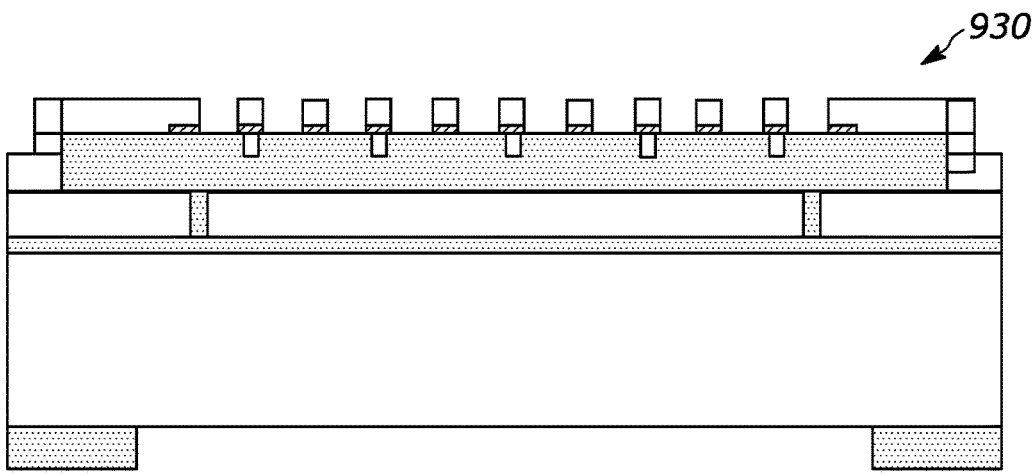
Figure 17E:
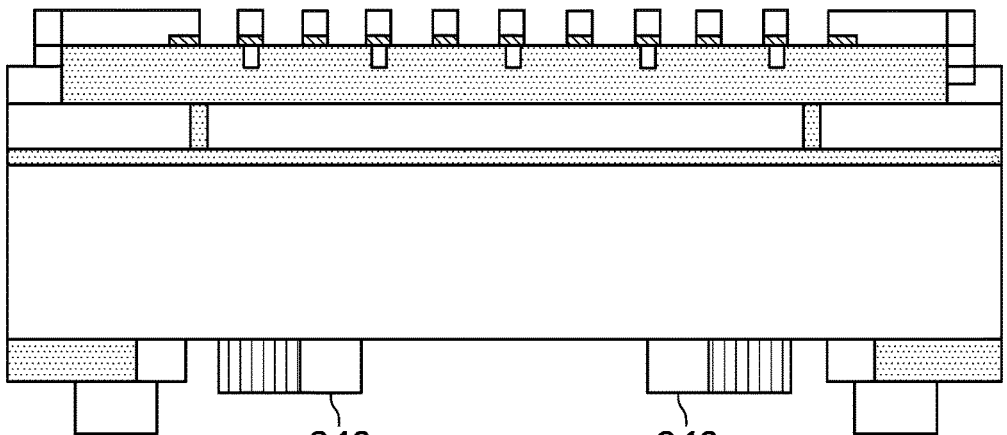
Figure 17F:
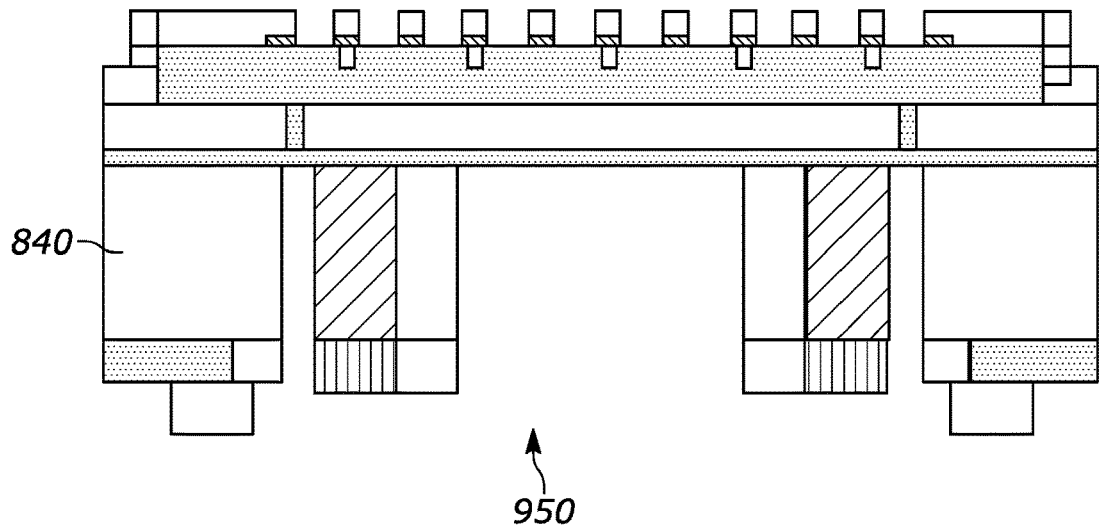
Figure 17G:
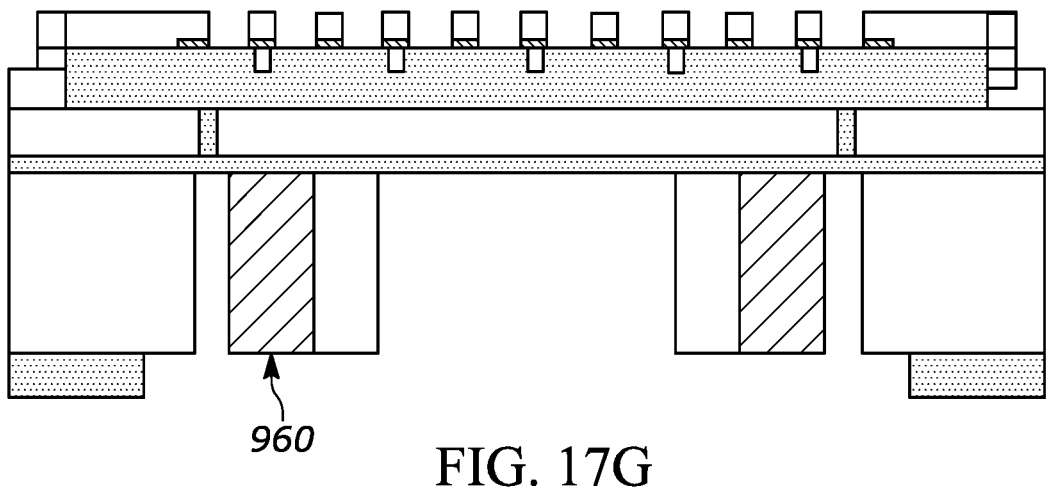
Figure 17H:
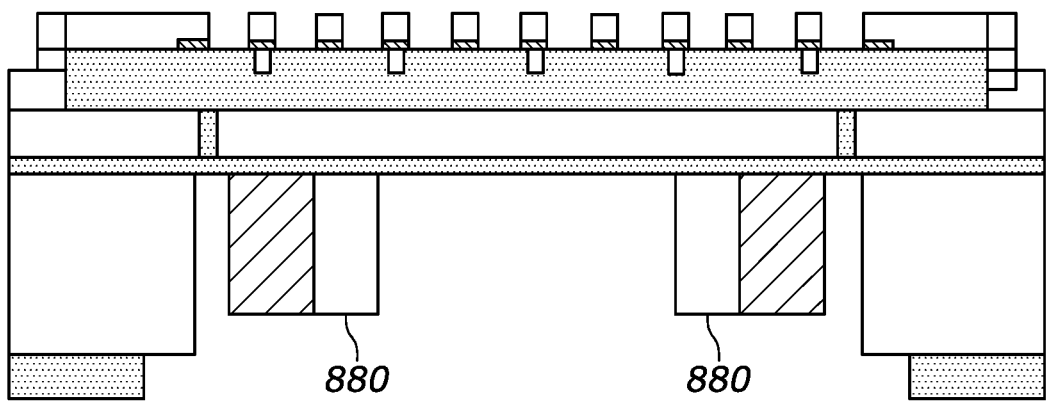
Figure 17I:
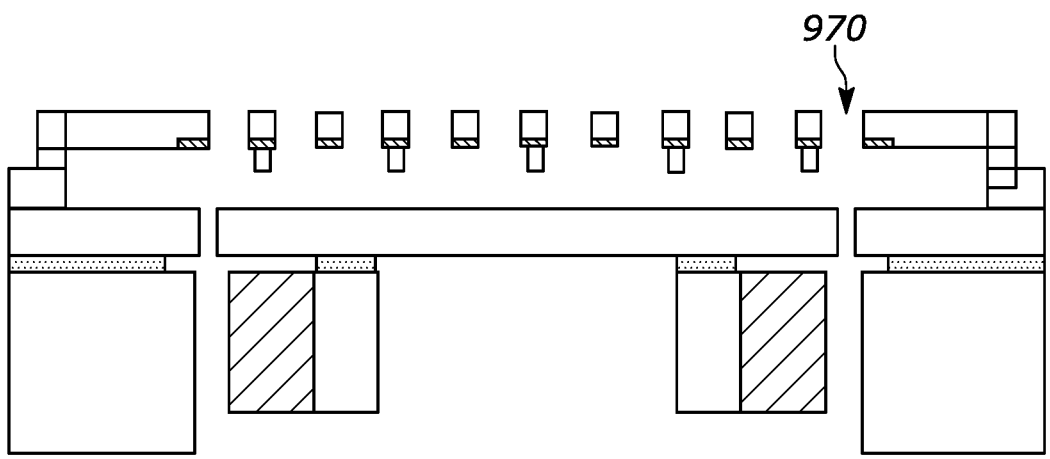

Referring to FIG. 17A, the process of fabricating the die 850 according to an embodiment begins with an SOI wafer 900. Trenches 910 are then etched in the device layer 912 (FIG. 17B). Next, a SiO2 trench fill 920 plus etch-back or chemical mechanical polishing (CMP) occurs (FIG. 17C). Referring to FIG. 17D, front-side processing 930 is then completed. The proof mass shape is then defined using a photoresist mask 940 (FIG. 17E). The substrate 840 is then etched through 950 using deep reactive ion etching (DRIE) (FIG. 17F). Next the photoresist mask is removed 960 (FIG. 17G). Then, the proof mass 880 is etched back using DRIE (FIG. 17H). Finally, a release etch is carried out 970 (FIG. 17I).

According to a possible embodiment, a MEMS sensor can include a base. The MEMS sensor can include a lid mounted on the base, where the lid and the base can define an enclosure. The MEMS sensor can include a substrate disposed within the enclosure, the substrate having a first side and a second side, the substrate including an aperture extending from the first side through the substrate to the second side. The MEMS sensor can include a support structure coupled to the substrate the first side. The MEMS sensor can include a resilient structure coupled to the support structure. The MEMS sensor can include a rigid movable plate coupled to the support structure via the resilient structure and positioned over the aperture. The MEMS sensor can include a proof mass coupled to the movable plate, the proof mass extending into the aperture. The MEMS sensor can include an electrode located on an opposite side of the movable plate from the proof mass.

According to a possible implementation, the support structure can include at least one recess. The movable plate can include at least one tab extending out from an edge of the movable plate and into the at least one recess. The at least one tab can be shaped complimentarily with the recess. According to a possible implementation, the MEMS sensor can include a ledge coupled to the substrate. The movable plate can include at least one tab extending out from an edge of the movable plate to overlap the ledge.

According to a possible first embodiment related to the above embodiments, a microelectromechanical systems (MEMS) vibration sensor die comprises a substrate having a top portion, a mounting surface, and an aperture extending at least partially through a portion of the substrate. The die comprises a first electrode coupled to the top portion of the substrate and positioned over the aperture. The die comprises a second electrode disposed between the substrate and the first electrode, where the second electrode is spaced apart from the first electrode. The die comprises a proof mass coupled to the first or second electrode, the proof mass freely suspended within aperture, and the proof mass recessed relative to the mounting surface of the substrate. The proof mass moves the first electrode or the second electrode from which it is suspended in response to vibration.

According to a second possible embodiment related to the first embodiment the die comprises a lateral support member adjacent the proof mass, wherein the lateral support member limits movement of the proof mass in a direction non-parallel to a direction of movement of the first or second electrode to which the proof mass is coupled.

According to a third possible embodiment, related to the second embodiment, the die further comprises a plurality of protrusions, the plurality of protrusions extending from the substrate toward the proof mass or from the proof mass toward the substrate, wherein the lateral support member is a part of the substrate from which the protrusions extend or a part of the substrate toward which the protrusions extend from the proof mass.

According to a fourth possible embodiment related to the third embodiment, the proof mass has a hollow portion and the substrate substantially surrounds the proof mass.

According to a fifth possible embodiment related to the first embodiment, the die further comprises a protrusion extending from the mounting surface of the substrate and integrally formed therewith.

According to a sixth possible embodiment related to any of the first through fifth embodiments, the die comprises a displacement-limiting support member coupled to the substrate, the displacement-limiting support member located beneath and spaced apart from the proof mass, wherein the displacement-limiting support member limits displacement of the proof mass in a direction of movement of the first or second electrode to which the proof mass is coupled.

According to a seventh possible embodiment related to the third embodiment, the die further comprises an acoustic sensor. The acoustic sensor comprises a second aperture extending through a second portion of the substrate. The acoustic sensor comprises a first acoustic electrode coupled to the substrate and positioned over the second aperture. The acoustic sensor comprises a second acoustic electrode disposed between the substrate and the first acoustic electrode, where the second acoustic electrode is spaced apart from the first acoustic electrode. The first acoustic electrode or second acoustic electrode is movable relative to the other in response to sound.

According to an eighth possible embodiment related to one of the first through fifth embodiments, the die is in combination with a base portion of a MEMS sensor housing, the mounting surface of the substrate mounted on the base portion and the aperture extending through the substrate, and the proof mass disposed between the base portion and the first electrode. The die is also in combination with a displacement-limiting support member coupled to the base portion, the displacement-limiting support member located beneath and spaced apart from the proof mass, wherein the displacement-limiting support member limits displacement of the proof mass in a direction of movement of the first or second electrode to which the proof mass is coupled.

According to a ninth possible embodiment related to the eighth embodiment, the combination further comprises an adhesive coupling the mounting surface of the substrate to the base portion; and at least one rigid post embedded in the adhesive and disposed between the substrate and the base portion.

According to a tenth possible embodiment related to the ninth embodiment, the combination further comprises a MEMS sensor housing comprising a lid mounted on the base portion; and an integrated circuit disposed in the housing, the integrated circuit electrically coupled to the vibration sensor and to electrical contacts on a surface-mounting interface disposed on an external surface of the base portion.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. A microelectromechanical systems (MEMS) device comprising:
    a substrate having a first side and a second side, the substrate including an aperture extending from the first side through the substrate to the second side;
    a support structure coupled to the substrate first side;
    a resilient structure coupled to the support structure;
    a rigid movable plate coupled to the support structure via the resilient structure and positioned over the aperture;
    a proof mass coupled to the movable plate, the proof mass extending into the aperture; and
    an electrode located in an area on, and spaced from, an opposite side of the movable plate from the proof mass,
    wherein the movable plate is substantially planar in a plane,
    wherein the resilient structure allows movement of the movable plate in a direction perpendicular to the plane and restrains movement in a direction parallel to the plane,
    wherein the support structure comprises at least one recess,
    wherein the movable plate comprises at least one stopper tab extending out from an edge of the movable plate and into the at least one recess, where the at least one stopper tab is shaped complimentarily with the recess,
    wherein the resilient structure comprises a plurality of resilient structures coupled between the movable plate and the support structure,
    wherein each resilient structure has a plurality of pairs of first beams and a plurality of gaps with each gap located between each pair of first beams, where one beam of each pair first beams has a same length and is substantially perpendicular to another beam of each pair of first beams and
    wherein each pair of first beams is connected to another pair of first beams by a second beam of a plurality of second beams, where each second beam has a same length and is substantially perpendicular to each respective connected pairs of first beams.

2. The MEMS device according to claim 1, wherein the resilient structure restrains rotation of the movable plate out of the plane.

3. The MEMS device according to claim 1, wherein the resilient structure is fabricated from a same layer as the movable plate and support structure.

4. The MEMS device according to claim 1,
wherein the at least one stopper tab and the at least one recess allow movement in a direction perpendicular to the plane and restrain movement parallel to the plane.

5. The MEMS device according to claim 1, further comprising a ledge coupled to the substrate, where the at least one stopper tab extends from the movable plate and overlaps the ledge.

6. The MEMS device according to claim 1, wherein the movable plate is electrically-conductive.

7. The MEMS device according to claim 1, wherein the movable plate comprises a plurality of layers including:
at least one insulator layer, and
at least one an electrically-conductive layer.

8. The MEMS device according to claim 1, further comprising a fixed plate on an opposite side of the movable plate from the proof mass, where the fixed plate is fixed relative to the substrate, and where the fixed plate comprises the electrode.

9. The MEMS device according to claim 8, wherein the fixed plate is electrically-conductive.

10. The MEMS device according to claim 8, wherein a portion of the fixed plate is electrically conductive.

11. The MEMS device according to claim 8,
wherein the movable plate is electrically-conductive, and
wherein movement of the movable plate relative to the fixed plate changes a capacitance between the movable plate and the fixed plate.

12. The MEMS device according to claim 8, wherein the movable plate comprises at least one opening configured to allow venting between the aperture and an area on an opposite side of the movable plate from the aperture.

13. The MEMS device according to claim 1, further comprising:
a base; and
a lid mounted on the base, where the lid and the base define an enclosure, and where the second side of the substrate is mounted on the base within the enclosure.

14. The MEMS device according to claim 13, further comprising:
a surface mount interface disposed on an external surface of the enclosure, the surface mount interface including electrical contacts; and
an integrated circuit disposed in the enclosure, the integrated circuit electrically coupled to the movable plate and to the electrical contacts.

15. The MEMS device according to claim 1,
wherein the aperture comprises a first aperture,
wherein the MEMS device further comprises an acoustic sensor including:
a second aperture extending from the first side through the substrate to the second side;
a first acoustic sensor electrode coupled to the substrate and positioned over the second aperture; and
a second acoustic sensor electrode disposed between the substrate and the first acoustic sensor electrode, the second acoustic sensor electrode spaced apart from the first acoustic electrode, and
wherein the first acoustic sensor electrode or the second acoustic sensor electrode is movable relative to the other in response to sound.

16. A microelectromechanical systems (MEMS) sensor comprising:
a base;
a lid mounted on the base, where the lid and the base define an enclosure;
a substrate disposed within the enclosure, the substrate having a first side and a second side, the substrate including an aperture extending from the first side through the substrate to the second side;
a support structure coupled to the substrate first side;
a resilient structure coupled to the support structure;
a rigid movable plate coupled to the support structure via the resilient structure and positioned over the aperture;
a proof mass coupled to the movable plate, the proof mass extending into the aperture; and
an electrode located in an area on, and spaced from, an opposite side of the movable plate from the proof mass,
wherein the support structure comprises at least one recess,
wherein the movable plate comprises at least one tab extending out from an edge of the movable plate and into the at least one recess, where the at least one tab is shaped complimentarily with the recess,
wherein the resilient structure comprises a plurality of resilient structures coupled between the movable plate and the support structure,
wherein each resilient structure has a plurality of pairs of first beams and a plurality of gaps with each gap located between each pair of first beams, where one beam of each pair first beams has a same length and is substantially perpendicular to another beam of each pair of first beams, and
wherein each pair of first beams is connected to another pair of first beams by a second beam of a plurality of second beams, where each second beam has a same length and is substantially perpendicular to each respective connected pairs of first beams.

17. The MEMS sensor according to claim 16, further comprising a ledge coupled to the substrate,
wherein the at least one tab extends out from the edge of the movable plate to overlap the ledge.

* * * * *